United States Patent [19]

Vitucci

[11] 3,999,323
[45] Dec. 28, 1976

[54] FISHING ROD REST AND BITE SIGNAL
[75] Inventor: Ralph P. Vitucci, Schiller Park, Ill.
[73] Assignee: Lawrence Peska Associates, Inc., New York, N.Y. ; a part interest
[22] Filed: Oct. 1, 1975
[21] Appl. No.: 618,325
[52] U.S. Cl. .................................................. 43/17
[51] Int. Cl.² ....................................... A01K 97/12
[58] Field of Search ........................................ 43/17
[56] References Cited
UNITED STATES PATENTS

| 2,538,788 | 1/1951 | Massino | 43/17 |
| 2,554,197 | 5/1951 | Kronquest | 43/17 |
| 3,618,068 | 11/1971 | Sloan | 43/17 X |

Primary Examiner—Russell R. Kinsey
Assistant Examiner—Daniel J. Leach
Attorney, Agent, or Firm—Jack D. Slobod

[57] ABSTRACT

A fishing rod rest and bite signalling device includes a helically coiled spring upstanding from a casing which carries a forked member at its top end for supporting a fishing rod. A contact disc is supported on a post adjacent the spring, so that the spring is bent by a bite on the fishline to engage the disc. The casing includes a buzzer and a lamp which are selectively placed in a battery circuit including the spring and disc contact arrangement by a selector switch. An alternate embodiment forked member has intersecting channels for holding a pair of crossed fishing rods.

4 Claims, 4 Drawing Figures

U.S. Patent  Dec. 28, 1976  3,999,323
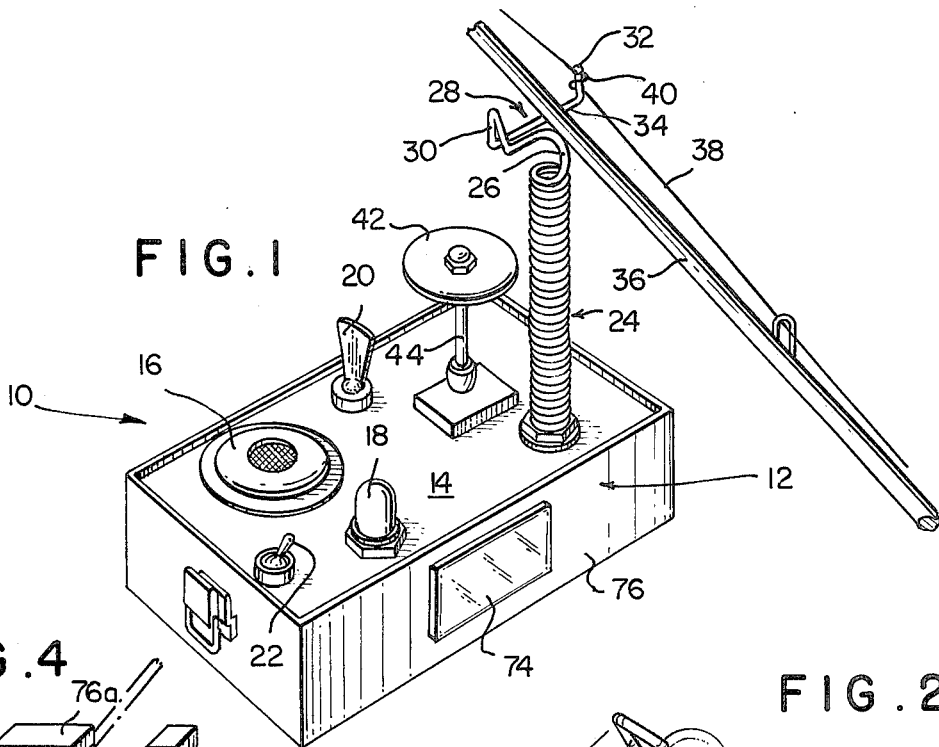
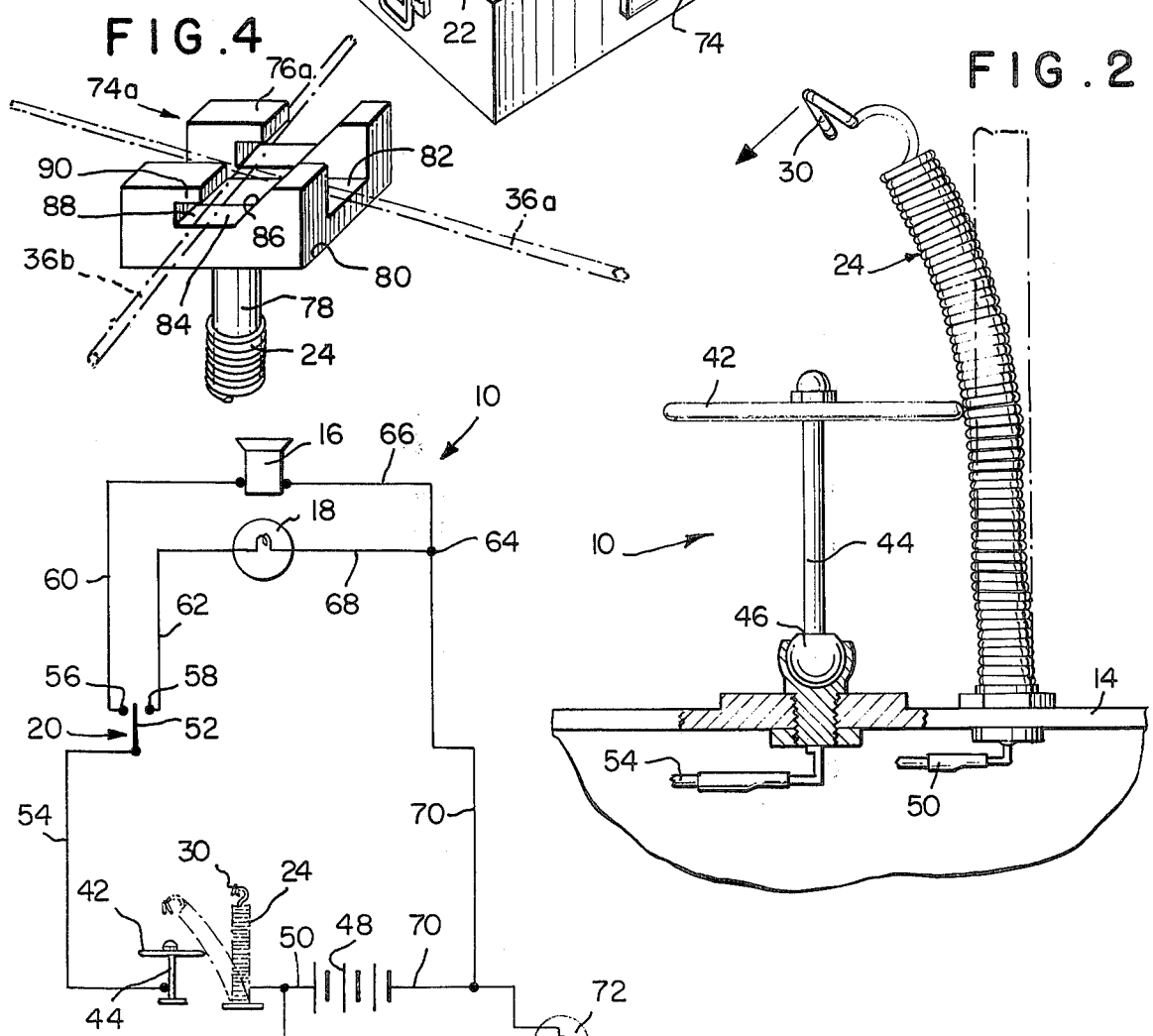

FISHING ROD REST AND BITE SIGNAL

FIELD OF THE INVENTION

The present invention relates generally to devices for signalling that a fish has bitten on a fishing line. In its particular aspects, the present invention relates to the provision of an upstanding bendable shaft for supporting a fishing rod in combination with a contact adapted to be engaged by the shaft when bent in response to a fish bite for actuating an electrical signalling means.

BACKGROUND OF THE INVENTION

While various devices have been known heretofore for signalling a bite on a fishing line, such devices were generally complicated by the provision of separate and distinct means for supporting the fishing rod and for sensing a bite on the fishing line. Illustrative of the prior art in this regard are the following U.S. Pat. Nos.: 2,948,076; 3,389,489; 3,571,536; 3,559,327; 3,680,244; 3,740,888; 3,798,630; and 3,835,568. Further, such prior art devices had provision for supporting only one fishing rod and for sensing a bite on only one fishing line.

OBJECTS OF THE INVENTION

It is an object of the present invention to provide a fish bite signalling device in which a fishing rod is supported on the end of a bendable shaft which bends in response to a fish bite to complete an electrical circuit for actuating a signal.

It is a further object of the present invention to provide a fish bite signalling device which is configured to support and sense a fish bite with respect to two fishing rods.

It is yet another object of the present invention to provide in a fish bite signalling device both audible and visual signalling means which are selectively operatively switched into a signalling circuit.

SUMMARY OF THE INVENTION

Briefly, the aforementioned and other objects of the present invention are satisfied by providing a casing housing a battery, a visual signal means and an audible signal means. A bendable tubular shaft formed by a helically coiled wire extends upwards from the casing and has a forked member at its free end for supporting a fishing rod. The fishing line is wrapped about the forked member and a contact is provided alongside the shaft which is engaged thereby when the shaft is bent in response to a fish bite force.

A selector switch is provided on the casing for operatively selecting the audible or visual signal means to be placed in series with the battery via the switch formed by the combination of the shaft and contact.

In order to support a pair of fishing rods in crossed relation, the forked member is provided as a block having a pair of orthogonally intersecting channels or grooves for receiving the rods. The block includes a stem received in the free end of the tubular shaft.

Other objects, features and advantages of the present invention will become apparent upon perusal of the following detailed description of the preferred embodiment thereof when taken in conjunction with the appended drawing wherein:

FIG. 1 is a pictorial presentation of the bite signalling device of the present invention including a rest for a fishing rod;

FIG. 2 is a partial elevation of FIG. 1 with a casing partly broken away;

FIG. 3 is an electrical schematic for the device of FIGS. 1 and 2; and

FIG. 4 is a pictorial presentation of an alternate fishing rod rest for the bite signalling device of FIGS. 1 and 2.

DETAILED DESCRIPTION

Referring first to FIGS. 1 through 3 of the drawing, the fish bite signalling device of the present invention is generally indicated by the reference numeral 10. Device 10 includes a rectangular casing or housing 12 having a top wall 14 on which are mounted a buzzer 16, an indicator lamp 18, a single pole-double throw-center off switch 20, and an on-off toggle switch 22. Further, a bendable tubular shaft 24 formed by a helically coiled wire 26 is provided mounted upstanding from top wall 14. The wire 26, at the top or free end of shaft 24 is bent into a forked member 28 having a pair of legs 30 and 32 extending upward from opposite ends of a horizontal length 34 of wire 26 forming a bridge. The bridge 34 serves as a support or rest for a fishing rod 36 with the legs 30 and 32 capturing the fishing rod in place.

Preferably, the fishing line 38 associated with rod 36 is wrapped around one of the legs 30 or 32, such as at 40, so that when a fish bites on the deployed end of line 38, the tension in the line due thereto will cause the shaft 24 to bend or deflect as shown in FIG. 2. To enable signalling in response to this deflection of shaft 24, I provide a disc-shaped contact 42 mounted on a post 44 upstanding alongside the shaft. Post 44 is mounted to top wall 14 via a ball joint 46 which enables the disc contact 42 to be adjustably spaced relative to the shaft 24 to set the amount of deflection required for the shank to engage the contact.

Within casing 12 there is provided a battery 48 for energizing the buzzer 16 or lamp 18 in response to shaft 24 engaging disc 42. Therein, the shaft 24 is connected to the positive end of battery 48 by lead 50. The metal post 44 is connected to the wiper 52 of switch 20 by lead 54. Contacts 56 and 58 of switch 20 are respectively connected to one side of the buzzer 16 and lamp 18 by leads 60 and 62 and the other sides of the buzzer and lamp are respectively brought to common point 64 by leads 66 and 68. Point 64 is connected to the negative side of battery 48 by lead 70.

It will be appreciated by those skilled in the electrical arts that switch 20 serves to select either buzzer 16 or lamp 18 for energization by battery 48 in a circuit which is completed by the shaft 24 engaging disc 42. It should also be appreciated that since switch 52 has a center-off position, where neither of the contact 56 or 58 are engaged, that position obviates the need to provide a separate on-off switch.

As an additional feature useful for night fishing, I provide a high intensity lamp 72 mounted behind a window 74 in a sidewall 76 of casing 12. Lamp 72 is connected in an additional series circuit with battery 48 via the toggle switch 22.

It frequently occurs that a fisherman would like to set up a pair of fishing rods in an unattended fashion. Therefore, it is desirable to provide a signal indication if either of a pair of fishing rods has a bite. To solve this problem, I utilize the modified rest or support 74a illustrated in FIG. 4. Therein, the rest 74a is formed as a generally rectangular molded plastic block 76a which has an integral cylindrical stem 78 projecting downward centrally from a bottom surface 80 of the block. Stem 78 is frictionally received in the central opening in the free end of tubular shaft 24. The block 76a has a pair of orthogonally intersecting grooves 82 and 84 formed in its top end for holding a pair of fishing rods 36a and 36b in crossed relation in the grooves. It will be appreciated from viewing FIG. 4 that the rest 74a is basically a doubly forked member.

Preferably the groove 82 is of rectangular cross-section while the groove 84 includes a sloping sidewall ramp 86 for wedging the rod 36b into a tightly fitting re-entrant portion 88 of the groove opposite sidewall 86. The portion 88 is covered by a horizontally projecting tab portion 90 of the block 76a for locking the rod 36b in place crossed over rod 36a. It will be appreciated that with the aforementioned configuration of rest 74a the two rods 36a and 36b may be snapped in place in crossed relation so that a fish bite force exerted on either of the rods will bend shaft 24 against disc 42 for setting off the signals 16 or 18.

While the preferred embodiments of the present invention have been described and illustrated in specific detail, it should be understood that modifications, additions and omissions in the details thereof are possible within the intended spirit and scope of the invention claimed herein.

What is claimed is:
1. A fish bite signalling device comprising: a casing; a bendable tubular member upstanding from said casing; said tubular member being formed of helically coiled wire; means carried on the free end of said tubular member for supporting a fishing rod; said fishing rod support means including a stem received in the free end of said tubular member; a contact means upstanding from said casing alongside said tubular member; said contact means being positioned to be engaged by said tubular member when said member is bent; electrically actuatable signal means carried by said casing; and means in said casing for electrically energizing said signal means in response to said member engaging said contact means.

2. The device of claim 1 wherein said casing carries a visual signal means; and an audible signal means and wherein said energizing means includes switch means for operatively selecting said visual signal means or said audible signal means as said electrically actuatable switch means, said switch means including a single pole, double throw, center-off switch.

3. The device of claim 1 wherein said fishing rod support member comprises a block on which is formed a pair of intersecting channels for supporting a pair of fishing rods in crossed relation.

4. The device of claim 2 wherein said casing carries a visual signal means and an audible signal means; and wherein said energizing means includes switch means for operatively selecting said visual signal means or said audible signal means as said electrically actuatable signal means, said switch means including a single pole, double throw, center-off switch.

* * * * *